(12) United States Patent
Rose et al.

(10) Patent No.: US 7,693,912 B2
(45) Date of Patent: Apr. 6, 2010

(54) METHODS FOR NAVIGATING COLLECTIONS OF INFORMATION IN VARYING LEVELS OF DETAIL

(75) Inventors: Daniel E. Rose, Cupertino, CA (US); Raymond Chung-Man Tam, San Francisco, CA (US); Christian Martin Riblet, Menlo Park, CA (US)

(73) Assignee: Yahoo! Inc., Sunnyvale, CA (US)

( * ) Notice: Subject to any disclaimer, the term of this patent is extended or adjusted under 35 U.S.C. 154(b) by 404 days.

(21) Appl. No.: 11/264,520

(22) Filed: Oct. 31, 2005

(65) Prior Publication Data

US 2007/0100799 A1 May 3, 2007

(51) Int. Cl.
*G06F 7/00* (2006.01)

(52) U.S. Cl. .................. 707/779; 707/805; 707/829; 707/786

(58) Field of Classification Search ................. 707/805, 707/779, 829, 786
See application file for complete search history.

(56) References Cited

U.S. PATENT DOCUMENTS

| | | | |
|---|---|---|---|
| 4,439,837 A | 3/1984 | Aiena et al. | |
| 4,536,873 A | 8/1985 | Leete | |
| 5,088,032 A | 2/1992 | Bosack | |
| 5,434,591 A | 7/1995 | Goto et al. | |
| 5,585,866 A * | 12/1996 | Miller et al. | 725/43 |
| 5,621,906 A * | 4/1997 | O'Neill et al. | 715/848 |
| 6,314,426 B1 * | 11/2001 | Martin et al. | 707/100 |
| 6,405,192 B1 * | 6/2002 | Brown et al. | 707/3 |
| 6,469,712 B1 | 10/2002 | Hilpert et al. | |
| 6,522,347 B1 | 2/2003 | Tsuji et al. | |
| 6,532,005 B1 | 3/2003 | Campbell | |
| 6,961,731 B2 * | 11/2005 | Holbrook | 707/102 |
| 7,047,252 B2 | 5/2006 | Buch et al. | |
| 2002/0107847 A1 | 8/2002 | Johnson | |
| 2002/0143978 A1 | 10/2002 | Kuramochi et al. | |
| 2003/0086119 A1 * | 5/2003 | Nagasaka | 358/1.15 |

(Continued)

OTHER PUBLICATIONS

Baudisch, Patrick et al., "Fishnet. A fisheye web browser with search term popouts: a comparative evaluation with overview and linear view," Patrick Baudisch Publications, 2004, located on the internet at <http://patrickbaudisch.com/publications/2004-Baudisch-AVI04-Fishnet.pdf>, 8 pages.

(Continued)

*Primary Examiner*—James Trujillo
*Assistant Examiner*—Fatima P Mina
(74) *Attorney, Agent, or Firm*—Hickman Palermo Truong & Becker LLP

(57) ABSTRACT

By varying the levels of detail associated with items in an ordered collection of information, items may be organized in a way to emphasize details about item of current interest. Displaying varying levels of detail about items in an ordered collection of information involves determining a focus, and based on their relative location to the focus adding additional detail to other items displayed from the collection of information. For instance, a user browsing a web search results list typically only sees a few essential details such as the name, link, and brief abstract about each item in the list. Providing the user with varying levels of detail about each item in the list helps them decide to where they want to navigate.

38 Claims, 6 Drawing Sheets

U.S. PATENT DOCUMENTS

| | | |
|---|---|---|
| 2003/0095096 A1 | 5/2003 | Robbin et al. |
| 2003/0137531 A1* | 7/2003 | Katinsky et al. ............ 345/716 |
| 2004/0225716 A1 | 11/2004 | Shamir et al. |
| 2004/0267730 A1 | 12/2004 | Dumais et al. |
| 2005/0027691 A1* | 2/2005 | Brin et al. ...................... 707/3 |
| 2005/0033657 A1* | 2/2005 | Herrington et al. ............ 705/26 |
| 2005/0080742 A1* | 4/2005 | Drummond et al. ........... 705/42 |
| 2005/0108234 A1 | 5/2005 | Oksanen et al. |
| 2005/0125397 A1* | 6/2005 | Gross et al. ..................... 707/3 |
| 2005/0183030 A1* | 8/2005 | Bertram et al. ............. 715/800 |
| 2005/0216859 A1* | 9/2005 | Paek et al. .................. 715/810 |
| 2005/0222989 A1 | 10/2005 | Haveliwala et al. |
| 2005/0228788 A1 | 10/2005 | Dahn et al. |
| 2005/0262447 A1 | 11/2005 | Shoemaker |
| 2005/0285866 A1 | 12/2005 | Brunner et al. |
| 2006/0064378 A1* | 3/2006 | Clementz et al. .............. 705/40 |
| 2006/0090182 A1* | 4/2006 | Horowitz et al. .............. 725/40 |
| 2006/0217967 A1* | 9/2006 | Goertzen et al. ............ 704/201 |
| 2006/0248294 A1* | 11/2006 | Nedved et al. .............. 711/162 |
| 2007/0050251 A1 | 3/2007 | Jain et al. |
| 2007/0168413 A1 | 7/2007 | Barletta et al. |

OTHER PUBLICATIONS

Janecek, Paul et al., "A Framework for Designing Fisheye Views to Support Multiple Semantic Contexts," Swiss Institute of Technology Lausanne, 2002, located on the internet at <http://hci.epfl.ch/website/publications/2002/AVI_final_bw.pdf>, 8 pages.

Paek, Tim et al., "WaveLens: A New View onto Internet Search Results," CHI, vol. 6, No. 1, 2004, pp. 727-734.

Robertson, G.G. et al., "The Document Lens," Xerox Palo Alto Research Center, UIR-R-1993-08, 9 pages.

Baudisch, P. et al., "Fishnet, a fisheye web browser with search term popouts: a comparative evaluation with overview and linear view" (May 2004) http://patrickbaudisch.com/publications/2004-Baudisch-AVI04-Fishnet.pdf, 8 pages.

Igarashi, T., "Speed-dependent Automatic Zooming for Browsing Large Documents" 2000.

* cited by examiner

01 | iPodHacks:: The Latest and Greatest News and info for Your iPod
02 | ipodhacks - ipod.hackaday.com
03 | O'Reilly: Hacking iPod and iTunes
04 | Amazon.com: iPod Fan Book: Books
05 | oreilly.com - Online Catalog: iPod and iTunes Hacks, First Edition
06 | G4 - Feature - Hack Your iPod — 130
07 | iPodHacks
You mean you can do more than play MP3's on it? ... weblogs.oreilly.com: Mac. iPodHacks. Steve McCannil
http://www.oreillynet.com/pub/wig/1268
08 | All things iPod, iTunes and beyond | iLounge
Formerly iPodlounge. The world's leading iPod resource for news, reviews, forums, tips, tutorials, software and more... New accessories abound: iPod docks mixed with flash readers and ... 1G-4G iPod, iPod photo. iPod mini and iPod shuffle batteries ... for the life of an iPod. Batteries can be ...
http://www.ilounge.com/

PAGE CONCEPTS:
nano | reviews | apple | ipod | photo | battery | ipod shuffle | silicone | software | ipod mini | 4g |

MORE PAGES FROM THIS SITE:
• iPod & iTunes Hacks' book released

09 | iPod Tips, iPodHacks, iPod Mods and iPod Firmware
iPod Tips, iPodhacks, mods and firmware. Customize your ipod and ipod mini with *your* own ipod software and ha
http://www.extremeipod.com/category2/0,1738,1634463,00.asp — 131
10 | Wired News: iPod: Music to Hackers' Ears
11 | MacDevCenter.com: Reclaiming Hacks
12 | HOW-TO: Hacking the iPod firmware (changing the graphics) - Engadget - www.engadget.com

SUGGESTIONS

Page topics — 411
- electronics
- car audio
- satellite radio
- speakers
- home theater

- cameras
- fast shipping
- alpine
- sony
- new products

— 412

Related pages from this site
- www.crutchfield.com/cgi-bin/Prod/menu.asp
- www.crutchfield.com/cgi-bin/Prod.asp?a=0
- www.crutchfield.com/cgi-bin/Prod.asp?a=0&co

— 413

Related Sites
- www.harmankardon.com
- www.infinitysystems.com
- www.audiovox.com

— 414

Other sites that link to this site
- E-lynks automobile links
- Code Free DVD Buying Guide
- The Virtual Times, Audio Links

MY NOTES

▲ GM Foods Paper
▲ Blog Ideas
▲ Music for car
▲ To Do List

CRUTCHFIELD  Your Electronics Shopping Alternative

Need Help?
Chat Now!

Car Audio
Car Video
DVD
CD
Satellite
Speakers
Wiring
Clearance
Accessories
Tech Support
FAQ

*FREE, Fast Shipping* Get it within 3 days

Car Stereo Blowout!
Save big on the latest car audio/video

Check out all the great prices

| Car Stereo | Car Video | Accessories |

Featured Items:

HISTORY

METHODS FOR NAVIGATING COLLECTIONS OF INFORMATION IN VARYING LEVELS OF DETAIL

FIELD OF THE INVENTION

Tools and techniques described herein relate to an interactive user interface. In particular, the tools and techniques relate to an interactive user interface for navigating collections of information.

BACKGROUND

Access to electronic information has grown exponentially over the years. Mass storage devices, such as CD-ROMs, DVDs, hard disks, etc., store more information than ever before. Through them users can access encyclopedias, dictionaries, directories, indices, electronic bibliographies, and other large collections of information on their local computer. Moreover, access to networks, particularly the Internet, provides other opportunities to receive and browse information. For example, through personal computers connected to the Internet, users send and receive email, post on message boards, chat through instant messaging software, perform electronic calendaring, browse classified ads at news sites, look up address book information, browse websites of interest, search for information, and perform many other similar tasks. Other electronic devices such as cell phones, game consoles, personal digital assistants (PDAs) provide similar functionality.

As access and reliance upon electronic devices as means for gathering and viewing information has grown, so has the need for better tools to search, view, and browse the information. Also, an improved user interface for performing such actions may improve the user experience.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 1 illustrates an exemplary display depicting items in an ordered collection of information in varying levels of detail, in accordance with an embodiment of the invention.

FIG. 4 illustrates an exemplary display depicting dynamic navigation suggestions associated with a web page, in accordance with an embodiment of the invention.

DETAILED DESCRIPTION

Figure 2:
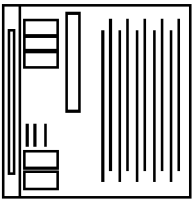
FIG. 2 illustrates an exemplary display depicting items in an ordered collection of information in alternative levels of detail, in accordance with an embodiment of the invention.

In the following description, for the purposes of explanation, numerous specific details are set forth in order to provide a thorough understanding of the present invention. It will be apparent, however, that embodiments of the invention may be practiced without these specific details. In other instances, well-known structures and devices are shown in block diagram form in order to avoid unnecessarily obscuring embodiments of the invention.

Four techniques are discussed herein for enhancing a user's experience while using an electronic device to navigate through collections of data: Semantic Fisheye, Dynamic Suggestions, Nonlinear Response Navigation, and Audio Feedback. These techniques, although described separately, may clearly be used in combination. They provide a flexible, interactive, and engaging user interface for navigating electronic collections of information.

The techniques described herein facilitate the display of additional information about ordered collections of information. The additional information includes varying levels of detail associated with items in the collections of information. By varying the levels of detail associated with items, techniques may organize the display to show more items, emphasizing details associated about an item of current interest. For instance, a user browsing a web search results list typically only sees a few essential details such as the name, link, and brief abstract about each item in the list. The techniques described herein provide the user with varying levels of detail about each item in the list to help them decide to where they want to navigate.

In another scenario, the techniques described herein help users navigate collections and the underlying reference items in the collections by displaying related information and suggested links to guide the navigation experience. For example, a user browsing an Internet sports site might be shown dynamically generated links to fantasy sports websites, sports and team message boards, and other sports-related sites. Clicking on a dynamically generated link, such as a fantasy sports website link, redirects the user to a new site. When the user arrives at the new site, the dynamically generated links and any other suggested information are automatically updated. By dynamically updating the links and other information, the user navigates the web (or other data set) with a reduced need to perform search queries.

Moreover, techniques are provided to help users feel more directly involved in the navigation experience by providing an enhanced interactive visual and audio experience.

The techniques may be implemented by a desktop application on a computer or other computing device (e.g. as a customized web browser), or by a combination of server-based and client-based tools, or by other methods.

Collections

As mentioned above, techniques are provided for helping users navigate through collections of information. In this context, a "collection" is any set of information items. An information item, in turn, is anything about which a computer can display information. For example, collections include lists, tables, frames, layers, and other techniques for conceptually organizing data. Often, collections are presented to users as a set of abstract items that provide access and links to more information. Some exemplary collections include search results, electronic programming guides (i.e., television listings), fantasy sports lists (teams, rosters, etc.), email message lists, message boards (topics, user info, message lists, etc.), web portals, web directories, database query results, help files, classified and personal ads, file listings, address book information, calendar information, news headlines, topical guides, indices, glossaries, electronic bibliographies, electronic reference materials, and other collections of information.

I. Semantic Fisheye

A fisheye lens in photography is one that causes the center of the field of vision to be magnified, while the periphery is reduced to allow a wide angle of view to be included. The fisheye concept has been used in some computer interfaces such as Apple's Mac OS® X dock and Xerox PARC's Document Lens. These interfaces are often described as "focus+context" because part of the display (the "focus") is magnified in size, while other parts of the display are not. "Context" describes the part of the display not magnified in size and conveys information about the environment surrounding the focus (e.g., the other pages in a document).

In these interfaces, the display size of a text/image of a document is dictated by whether the text/image is in the focus area or the context part. For example, a 100 page document might be displayed using a Document Lens view as a 10×10 array of pages with one of the pages being the focus page and the other 99 being context pages. In a focus+context environment, the text of the focus page is large enough to read, while the context pages are presented with text so small that it is not readable.

Focus

In contrast to the Document Lens view, the semantic fisheye techniques described herein display the "focus" portion in greater "semantic detail". That is, the focus portion does not simply contain the same information in a magnified format, but rather contains additional information that is not displayed at all when the portion is not in the focus. Moreover, the context items are shown in such a way that some of the information is always readable. Generally, the focus is designated through user interaction with the collection. For example, in an email message list, a user presses the down arrow key to navigate down to a particular email message. In one embodiment, when the user stops pressing the key, the current message becomes the focus. Accordingly, that message, unlike a typical preview, is displayed in-place in greater semantic detail than other messages in the list.

Semantic Detail

Semantic detail includes any information reasonably associated with an item in a collection. For instance, the semantic detail for an item in a web search results list may include text and images from a linked web page, or a thumbnail view of a referenced page, a summary compiled from extracted data from the web page, a written summary, reviews of the page and its product, statistical data about the referenced site (e.g., how often the site is accessed), etc.

The type and amount of semantic detail displayed varies between collections. For example, a list of players for a fantasy sports draft might include as semantic detail a player's previous year statistics, his or her career statistics, and player analysis by fantasy sports experts. The semantic detail for a book listed in electronic library index might include the author's name, brief bio, birth date, death date, the names of authors from the same era, a brief summary of the book, and other details.

Note that semantic detail is not limited to information directly connected to an item in a collection. Semantic detail may be derived from content referenced by the item. For instance, assume a web page about C++programming contains links to various online C++ tutorials. In one embodiment, the techniques described herein detect the referenced subject matter of one of the links (C++ programming tutorial) and generate additional semantic detail to include in the display. The additional semantic detail may include links to other C++ programming language tutorials, sites where the user may purchase books about programming, download sites for development tools, location of support and user forums, and other related information. In this example, none of these additional semantic details was directly referenced by any of the links on the web page, and none of the additional semantic details was directly extracted from the web pages corresponding to the referenced links. However, the exemplary semantic detail includes additional resources that may be derived from the web page content. As should be apparent, the type and amount of semantic detail displayed with an item varies immensely based on context and implementation.

The amount of semantic detail displayed for an item in a collection grows and shrinks according to its position in relation to the focus. In one embodiment, the closer an item is to the focus, the greater the amount of semantic detail displayed for the item. Similarly, the further away an item is from the focus the fewer the number of details displayed. Items in a collection grow and shrink by the addition and subtraction of semantic detail.

To illustrate a focus and semantic detail, consider for example, the World Wide Web ("web"). The web comprises a vast amount of interlinked data. In fact, the sheer amount of data on the web can make it difficult to find specific information. Typically, to navigate the web, web pages provide hyperlinks that can redirect a user to a new page on the same site or to a site halfway around the world. However, finding specific information in this way is hit or miss. Therefore, web search engines such as Yahoo! and Google were developed, which allow users to submit queries to find the information they seek on the web. To find information, a user typically submits a query to a web search engine, and the web search engine returns a list of web search results. The web search results list is an ordered collection of information, displaying various links to web pages that contain content related to the search query. Navigating a long list of web search results can be difficult, since the amount of information shown about each result is so small. In one embodiment, this problem is addressed by showing items in the web search results list with varying levels of semantic detail. Accordingly, based on user input, one of the web search results (items) is identified as the focus. This focus item is shown in more detail (e.g., with a thumbnail image and a written summary of the page) than the other items in the web search results list. Notably, other items in the list might also be shown in lesser degrees of detail. The semantic detail provides more information about focus items and helps users make more informed selections as they access links in the web search results list.

As another example, consider the use of an electronic programming guide ("EPG"), which displays information about broadcast programs. Typically, an EPG shows only essential details about a program to users. In one embodiment, when a user highlights an item in an EPG, additional semantic detail such as the names of actors performing in the show, plot summary, production information, copyright information, and running time, is included in the display. An EPG user views the additional details without having to navigate through multiple menus. In one embodiment, items adjacent to the focus are also displayed in greater detail.

Finally, consider a computer-based encyclopedia, which often lists a set of "related topics" at the end of its articles. In one embodiment, semantic fisheye techniques dynamically add semantic detail to items in the "related topics" section. For example, an article about rockets lists words such as "space," "moon," "sun," and "astronaut" as related topics and provides corresponding links to articles in the encyclopedia.

In one embodiment, when a user highlights the word "moon," semantic detail is displayed. Those details might include a link to an encyclopedia article about Neil Armstrong, a link to a website about the moon, thumbnail images taken of the moon, a link to where a user might buy a lunar land claim, etc. In other embodiments, other items in the related topics list receive additional semantic detail.

FIG. 1 shows a user interface displaying an ordered collection in a semantic fisheye view with three levels of semantic detail: a focus level, adjacent level, and a distant level. An item's proximity to the focus defines the item's level of semantic detail. Moreover, the level of semantic detail refers to the amount of information displayed along with an item.

As illustrated in FIG. 1, the semantic fisheye technique may be implemented as an extension of a web browser. In other implementations, the semantic fisheye technique is implemented by an extension, an application, or script executed by a web browser, database client program, file explorer, or other client-side application. Moreover, specific implementations may be written in any of a number of programming languages (e.g., C++, C#, Visual Basic, C, Java, XML, HTML, JavaScript, Flash, etc.). Alternatively, variations are implemented by stand-alone programs, distributed programs, server-side programs, or a combination of these variations.

In FIG. 1, the collection 100 is a web search results list returned in response to a user submitted query relating to iPod® digital music players. A user navigates through the items in the list. As shown, the user stops and selects item (08) 110. Item 110 becomes the focus and, accordingly, is presented with greater semantic detail than the other items in the web search results list 110. For example, adjacent items 120, 121 are shown with an "adjacent" level of detail, which means that the amount of semantic detail presented in connection with those items is less than the semantic detail associated with the focus. Distant items 130, 131 show even fewer details.

The additional semantic detail for focus item 110 includes a longer abstract 114 (longer than any of the other items'), a thumbnail view of the referenced web page 113, and a number of supplementary pages 111 related to the linked page (e.g., "More Pages from this Site"), and other information 112 (e.g., "Page Concepts"). In this example, some of the semantic detail is extracted directly from the referenced web page (e.g. from metadata, text, images, or multimedia content from the referenced site). In fact, the abstract 114 was extracted from text on the referenced site's web page.

Other details are dynamically derived. In FIG. 1, the supplementary pages are results from the linked web page's own site 111. The "Page Concepts" 112 identify concepts disclosed in the web page and create potential new search queries related to those concepts. Then, clicking on one of the page concepts generates a new search using the new search query. The search queries can be derived from an index associated with concepts or alternatively, the identified concepts themselves are listed as search terms. In one embodiment, the Page Concepts 112 refer to sites and information related to focus item 110, but that are not directly extracted from content on the referenced page. Instead, keywords from the referenced web page are submitted in a new search query and the top results from that new search are displayed as part of the semantic detail.

The thumbnail preview 113 illustrates an example of visual content that might appear in a semantically detailed view of an item. Other types of visual content including icons representing the page (e.g., the company's logo), visual images (diagrams, drawings, or photographs) that appear on the page, still frames from video available on the page, and other visual content may also be displayed. In one embodiment, semantic detail might be retrieved from a cache or data store. Alternatively, semantic detail is pre-fetched.

As items get farther away from the focus, the less semantic detail that is displayed. Adjacent items 120, 121 because of their proximity to the focus item 110 are shown with a moderate amount of detail. Distant items 130, 131 because of their distance from the focus item 110 are merely shown as a single line of text. In this manner, as the user changes the focus (through user input), the display changes as does the level of semantic detail included for each item in a collection.

Note that the items listed in FIG. 1 do not require graphical manipulation or visual magnification. Instead, the text within a focus item might be the same size as text that is not in semantic focus. In this way, it is the amount of additional semantic detail that sets items apart. However, in one embodiment, items' shading, font size, font type, and font style might be modified according to their level of detail. For example, FIG. 1 illustrates that the font and shading for focus item 110 has been increased to further offset it from adjacent items. Similarly, the font size for adjacent items 120, 121 has also been increased, but to a lesser extent than the focus. Increasing the text size of the focus and adjacent items relative to distant items provides yet another mechanism for distinguishing items from each other.

As a web search results example, FIG. 1 identifies some of the types of semantic detail that are associated with a search results list. Other collections would include the same and/or different semantic detail. Additionally, although this example illustrates three levels of detail, the number of levels of detail may also vary.

One approach to managing various levels of semantic detail is to maintain a set of fields corresponding to specific types of details in each level of semantic detail. This may be done using a table, array, or other data structure. To illustrate, Table 1 defines several semantic details (Title, Long Abstract, Short Abstract, etc.) that might be associated with a web page. Table 1 also shows the levels of detail at which a particular detail might be displayed.

TABLE 1

| Item Detail | Level Range |
| --- | --- |
| Title | 0-N |
| Long Abstract | 3-N |
| Short Abstract | 0-2 |
| URL | 1-N |
| Services Buttons | 2-N |
| Page Preview | 3-N |
| "Click to Expand" | 0-2 |

In this example, according to the table, a web page's title is shown for all levels of semantic detail. This means that the title for every item in a collection (from the lowest level 0 to the highest level N) will be shown when the collection is displayed. At other levels of detail additional or other semantic detail is added or removed accordingly. For instance, a uniform resource locator ("URL") is shown for all items at level 1 and above. Similarly, services buttons (e.g., cache, RSS, related pages, etc.) are shown for all items at level 2 and above. At level 3, the short abstract is removed and a longer abstract and a page preview are added as semantic detail. At the focus level N, almost all the semantic detail is displayed.

In one embodiment, the amount of semantic detail displayed at each level is fixed. Alternatively, the amount of semantic detail might be modifiable by an operator or the user. In another embodiment, rules embedded in the code are used to render an item at a given level of detail.

FIG. 2 illustrates a variation on the search results list shown in FIG. 1. FIG. 2 illustrates an exemplary user interface displaying only two levels of detail: the focus level 210 and a context level for all other items in the collection of information. Notably, the types of semantic detail displayed in connection with focus item 210 may be the same as those illustrated in FIG. 1. In other embodiments, there may be more levels of semantic detail.

Referring again to FIG. 1, it should be noted that the display updates dynamically in response to user actions. The display itself can be coupled to a computer, cell phone, personal digital assistant ("PDA"), game centers, and other electronic devices. The user actions include movements of the computer mouse, joystick, or scroll wheel, keypresses (for example, on arrow keys), or commands sent by a game controller, stylus, or other input device. These actions cause the focus to change, which in turn causes each collection item to grow or shrink as needed to display the appropriate level of detail. As a result, some items may move up or down on the display to accommodate the changing size of their neighbors.

To illustrate the movements, consider a list of eight items as illustrated in Table 2. In this example, there are four levels of detail. Each item is assigned one of the following levels of semantic detail: very small, small, medium, or large, depending on where the focus is. These levels of semantic detail are labeled VS, S, M, and L, respectively. The rows of stars next to each label illustrates that there is a different amount of semantic detail for each item as a user browses the list. The more rows of stars the greater the amount of detail. Note in the table the level of detail is shown changing vertically, in reality the added semantic detail may be added either horizontally, vertically, diagonally, or in some other way, to each item.

Assuming the focus is initially on item 4, the amount of detail associated with each item in Table 2 is as follows:

TABLE 2

| Item | Detail Level | Content |
|---|---|---|
| 1. | VS | *** |
| 2. | S | *** |
|  |  | *** |
| 3. | M | *** |
|  |  | *** |
|  |  | *** |
| 4. | L | *** |
|  |  | *** |
|  |  | *** |
|  |  | *** |
| 5. | M | *** |
|  |  | *** |
|  |  | *** |
| 6. | S | *** |
|  |  | *** |
| 7. | VS | *** |
| 8. | VS | *** |

The amount of semantic detail for the first four items grows progressively as you move down the list. Item 4 is the focus and it has the most semantic detail (e.g., four rows of detail). Moving away from the focus, the amount of semantic detail becomes less.

Now, assume a user accesses this list and moves the focus down (e.g. by pressing the down arrow key). Item 5 becomes the new focus. In conjunction with the change in focus is a change to other items' levels of semantic detail. The resulting changes are illustrated in Table 3.

TABLE 3

| Focus | Detail Level | Content |
|---|---|---|
| 1. | VS | *** |
| 2. | VS | *** |
| 3. | S | *** |
|  |  | *** |
| 4. | M | *** |
|  |  | *** |
|  |  | *** |
| 5. | L | *** |
|  |  | *** |
|  |  | *** |
|  |  | *** |
| 6. | M | *** |
|  |  | *** |
|  |  | *** |
| 7. | S | *** |
|  |  | *** |
| 8. | VS | *** |

Table 3 illustrates that as a result of the change in focus, items 2 through 7 change their level of detail. Items 2, 3, and 4 became smaller (e.g., have fewer rows of detail) because they are now more removed from the focus, and items 5, 6, and 7 got bigger (e.g., have more rows of detail) because they moved closer to the focus.

These changes in items' levels of detail affect the display. The amount of display space taken up by an item grows and shrinks as its corresponding level of semantic detail grows and shrinks. For example, from Table 2 to Table 3, item 2 decreases in size from an S level of detail to VS. Consequently, the amount of space used by item 2 becomes smaller, freeing up display space. In one embodiment, this freed space can be assigned a value, namely "a." Similarly, item 3 changes from M to S, freeing up "b" amount of space, and item 4 changes from an L level of detail to M, freeing up "c" amount of space.

In contrast, when an item receives additional semantic detail (e.g. item 5 expands from an M level of detail to L), the item correspondingly consumes more display space. In one embodiment, this consumed space can be represented as a negative amount of free space. This means that when item 5 transitions from an M level of detail to L, the consumed space can be assigned a negative value, namely "−c." Note that in this example, it is assumed that the levels of semantic detail are symmetrical (e.g., items on the same level of detail consume the same amount of space). That might not always be the case. For instance, for a variety of reasons, each item in a level could have differing amounts of semantic detail. Those reasons might include the fact that certain information such as a graphics image are available for one item in a level, but not for another item in the same level, or certain types of items may have extra types of details assigned to them (e.g., a merchant website may list links to product reviews, and non-merchant sites might not). The position of an item in the display may also be a factor in determining how many details to show (e.g., if an item is at the bottom of the display, additional details remain hidden to avoid moving the rest of the display). Other factors may also be considered when determining how to display a collection of items.

Table 4 shows the basic transitions that occur to items in Tables 2 and 3, along with a variable representing the amount of freed display space that results from each transition:

TABLE 4

| Transition | Freed Space |
|---|---|
| S -> VS | a |
| M -> S | b |
| L -> M | c |
| M -> L | −c |
| S -> M | −b |
| VS -> S | −a |

As items change size and shift in the display, computations are performed to decide where to redraw each item on the display screen. In one embodiment, the computations calculate the amount of display space "freed" by a transition, wherein the freed space may be either a positive or a negative number. The freed space is used to determine item location.

As illustrated in Table 3, item 2 shrinks from S to VS, leaving free space between itself and neighboring item 3. Accordingly, item 3 needs to be drawn higher on the screen to fill the space vacated by the shrinkage of item 2. The change in the position of item 3's upper edge is the same as the distance freed by item 2, namely "a." Most computer display coordinate systems consider the top left of the screen to be x-, y-coordinates (0, 0) with coordinate numbers increasing as a position moves down and to the right. Hence, in one embodiment, moving by "a" means subtracting "a" from the y-coordinate. Table 5 illustrates the change in the y-coordinate of each item as the user moves the focus to the next item down (as happened in connection with Tables 2 and 3):

TABLE 5

| Focus | Transition | Size Change | Y-coordinate Change of the Upper Edge |
|---|---|---|---|
| 1. | None | 0 | 0 |
| 2. | S -> VS | a | 0 |
| 3. | M -> S | b | −a |
| 4. | L -> M | c | −a − b |
| 5. | M -> L | −c | −a − b − c |
| 6. | S -> M | −b | −a − b − c + c = −a − b |
| 7. | VS -> S | −a | −a − b − c + c + b = −a |
| 8. | None | 0 | −a − b − c + c + b + a = 0 |

In this example, items 3 through 7 move up or down in the display according to the freed space neighboring them, while simultaneously growing or shrinking as determined by the changing level of detail.

In one embodiment, items may move up or down on a display screen in order to accommodate the changing sizes of their neighbors. For example, assume a collection has eight items as illustrated above, but only five fit on the display screen. Since the focus is the fifth item in the display, the other four items above it might need to be moved up to make room for the focus's semantic detail. In another embodiment, adjacent item six is also expanded with an adjacent level of detail, causing additional change in the display. In some embodiments, items might be reordered or rearranged to properly fit a display screen.

To facilitate redrawing the display, certain parameters may need to be stored. For example, parameters identifying display screen size, the focus and the position of each item on the screen might be sufficient to calculate an item's new position in the display. Alternatively, other indicators and parameters are stored to compute the new display.

Finally, the change of focus can also be accompanied by visual or auditory cues to make the changes more noticeable to users. The semantic fisheye technique may be implemented thusly, or, in alternative ways.

II. Dynamic Suggestions

In the past, users who navigate collections of information have often alternated between searching and browsing environments. Take for example, the web user browsing a web page discussing a yet-to-be released movie. To find additional information about the movie, typically, a user stops browsing the current web page, navigates to a web search engine, and submits a search query related to the movie. In other words, the user interrupts their browsing, leaves the current web page, loses their current workflow, and starts navigating from scratch in a searching environment. The user returns to the browsing environment by clicking links in the web search results list. Later, to continue searching, the user has to return to the web search results list. The change from one environment to the other is disruptive to the user's navigation experience.

To limit this problem, some current web browsers keep a separate search results window open even after a user clicks a link to a new site. The problem with this approach is that the search results quickly become obsolete as the user navigates new websites. Moreover, even when a results window remains open, the search results themselves are not updated unless the user inputs a new or updated query.

To enhance the searching environment, some search engines have included certain limited search suggestions on search results pages. Generally these suggestions merely point out alternative keywords or related search items. For example, the Yahoo! web search engine used to show directory categories in its search results list. Additionally, the Yahoo! web search engine shows other search suggestions related to the query (e.g., "also try . . . "). Moreover, some shopping sites such as Amazon.com can recommend product-specific suggestions to users (e.g., "others who bought this item also bought . . . "). However, in these and other scenarios, the search engines' suggestions are limited because they do not extend beyond the searching environment and they are directed to specific queries and products. These drawbacks make it hard to efficiently explore electronic information.

To reduce the barrier between searching and browsing, dynamic suggestion techniques offer browse-type suggestions created and displayed in response to content identified in the current navigation space. In other words, the dynamic suggestion techniques show users not only where they are, but where else they may want to go in any environment (searching or browsing). Also, dynamic suggestion techniques may be constructed so that clicking on them causes a new search to be executed, so users do not have to return to the search engine and submit new queries.

For example, while navigating a website about iPod digital music players, a dynamic suggestion module will generate and present users with suggested links to related materials, such as reviews, merchant websites, and iPod user forums. The iPod-related suggestions might also include other information that may be of interest to the user such as links to competing products, general audio information, music lovers' websites, blogs, etc. Notably, these suggestions are accessible to the user in both searching and browsing environments.

In one embodiment, semantic fisheye techniques provide a vehicle for presenting the dynamic suggestions in a search or other context. For example, when the semantic fisheye techniques show a collection of information, a separate pane might show alternate, dynamically generated search suggestions related to the collection. When a web user navigates to a new page, the accompanying suggestion pane updates and shows additional suggestions related to the new page. Within the semantic fisheye display, much of the additional semantic detail about a focus item (or other item at a level of semantic detail) includes dynamically-generated suggestions.

Figure 3:
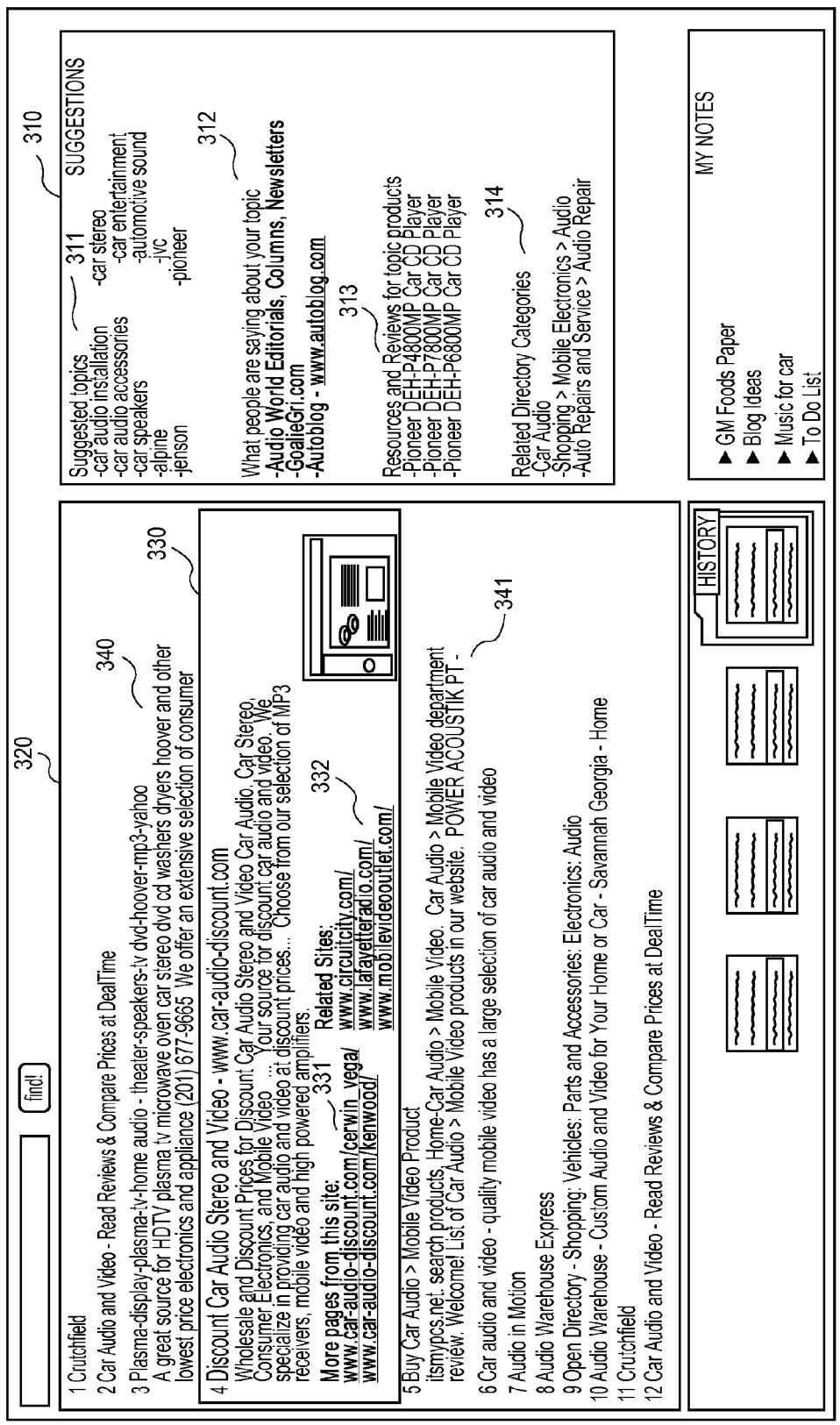
FIG. 3 illustrates an exemplary display depicting dynamic navigation suggestions associated with a search results web, in accordance with an embodiment of the invention.

FIG. 3 illustrates an exemplary display of an ordered collection, including an accompanying window listing dynamic suggestions related to the collection. As illustrated in FIG. 3, the dynamic suggestion techniques may be implemented by an extension of a web browser. In other implementations, the dynamic suggestion technique is implemented by an extension, an application, or script executed by a web browser, database client program, file explorer, or other client-side application. Moreover, specific implementations may be written in any of a number of programming languages (e.g., C++, C#, Visual Basic, C, Java, XML, HTML, JavaScript, Flash, etc.).

In one embodiment, the techniques are implemented by a custom browser designed to accommodate the dynamic suggestions. Alternatively, some embodiments are implemented as stand-alone programs, distributed programs, server-side programs, or a combination of these variations.

In FIG. 3, the collection 300 is a web search results list with accompanying dynamic suggestions. The left-side window 320 shows the results of a search for automobile audio components, and the right-side window 310 shows the dynamic suggestions associated with the search results. In this example, the dynamic suggestions are displayed in a separate window. Alternatively, other display techniques may be used, for example, a pull-down menu from the tool bar, a menu in a separate window frame, a collapsible list inserted into the current display, a pop-up window, text hovering over a page, or other variations or combinations thereof.

Inside the dynamic suggestions window 310, exemplary suggestions are displayed. These examples might include query-specific suggestions, result-specific suggestions, and page-specific suggestions.

Query-Specific Suggestions

Query-specific suggestions are those that are selected for inclusion based on the user's search query. These suggestions include additional search terms, advertiser sites associated with certain keywords, results from similar pages, results from a separate database, directory categories, blogs, forums, etc. For example, in FIG. 3, in the dynamic suggestions window 310, "Suggested topics" 311, "What people are saying about your topic" 312, "Resources and Reviews for topic products" 313, and "Related Directory Categories" 314 are all query-specific suggestions. These suggestions were generated based on the search query and are directly related to the query.

In one embodiment, the dynamic suggestions themselves might cause queries to execute when accessed. For example, items listed in the "Suggested topics" section 311 include alternate keywords and popular search queries similar to the displayed results' query. Clicking on one of the "Suggested topics" 311 submits an updated search query to the web search engine. When the web search engine has fetched results for the new query, those new results are displayed Result-Specific Suggestions Result-specific suggestions are those that are selected to be shown based on individual items in a search results list. Unlike query-specific suggestions, result-specific suggestions may or may not have a strong correlation with the search query. For example, the search query may be for "dogs", an item in a search results list may be a link to a site on the web that sells dog food. A result-specific suggestion for that item may be a link to a discount coupon for buying steaks at that same site. Result-specific suggestions, like query-specific suggestions, can include a number of details among them are additional pages from the same site or other sites similar in content to the result.

FIG. 3 illustrates several result-specific suggestions. For example, in the web search results window 320, focus item 330 lists "Related sites" 332 and "More pages from this site" 331, which contain links to other web pages. These suggested pages may or may not relate directly to the query, however, they do relate to the displayed result item 330.

Page-Specific Suggestions

Page-specific suggestions are an expanded version of result-specific suggestions. In one embodiment, the page-specific suggestions are shown when a user leaves a searching environment to browse a web page. FIG. 4, as discussed herein, illustrates this principle. The page-specific suggestions, like the query- and result-specific suggestions, can include a number of details, including important pages that link to the currently viewed page, as well as a list of concepts that describe what the page is about. As a user moves from page to page and link to link, the page-specific suggestions dynamically update to reflect information and details relevant to the current page content.

FIG. 4 illustrates a user interface 400 displaying page-specific suggestions 410. In this example, the user has moved from a searching environment (e.g., by clicking on a link in a web search results list) and entered a browsing environment (e.g., a car audio provider's website). Note that dynamic suggestions 410 are still displayed to the user even though the user has moved into a browsing environment.

As before, the suggestions 410 may include a variety of information, including "Page topics" 411 (which provides links to submit new queries to a search engine based on key concepts that characterize the page's subject matter or, alternatively, frequently occurring words), "Related pages from this site" 412 (which provides quicklinks to web pages on this website), "Related Sites" 413 (which contains links to competitor sites so the user can compare and contrast products), and "Other sites that link to this site" 414 (which displays links to other sites that link to this site). Other suggestions types may be provided.

With respect to the suggestions themselves, as with query- and result-specific suggestions, they may be generated in a variety of ways. In this example, content from the current page itself is submitted automatically as a new query to a search engine to determine the additional suggestions to display. In one embodiment, keywords from the web page's metadata are submitted to a back-end web search engine and the results of that search are displayed. Alternatively, key concepts that characterize the page's subject matter might be submitted as a new search, and those results displayed. In yet alternative embodiments, frequently occurring words from the web search results are submitted as a new web search, and those results displayed. Other variations may be implemented.

Generating Dynamic Suggestions

Dynamic suggestions may take a variety of forms. For example, some of the suggestions may take the form of a link that generates a new search, navigates to another web page, or provides some other action. The suggestions may also include text, images, multimedia content, or any other type of semantic detail. By providing these suggestions, a user researching a topic does not need to keep returning to a searching environment to find sought after information. Related suggestions are dynamically provided.

As to which suggestions should be displayed, as with semantic details, this is a matter of implementation. Referring back to FIG. 3, FIG. 3 shows an exemplary web search results list 320. In the web search results list 320, item (04) 330 is the focus of the display. Accordingly, it displays additional semantic details. In one embodiment, those details include suggestions that were dynamically generated. For example, the "Related Sites" section 332 includes dynamically generated links to ecommerce sites where car audio products may be purchased. The "More pages from this site" section 331 includes a list of web pages from the same website. The suggestions listed in connection with the focus item 330 are result-specific suggestions since they relate directly to a particular result of the search.

To illustrate the dynamic suggestions technique, assume a user submits a query to a search engine that returns over one hundred search results. In one embodiment, a suggestion engine might be configured to analyze the text of the top 50 returned search results and select the 12 or so most frequently occurring words in the web pages that correspond to the search results. The suggestion engine may present the frequently occurring words to the user as potential search terms, e.g., dynamic suggestions. In another embodiment, those new search terms are automatically submitted to the search engine to perform a new search. The top results of this new search are displayed as dynamic suggestions. In yet another embodiment, the concepts described in each page have been precomputed and stored in an index. At query time, those concepts vectors are fetched and the top concepts are chosen.

Alternatively, the suggestion engine may offer suggestions that are the result of a subsequent search on specific directories of information, types of forums (e.g., message boards, blogs, and other interactive sites), and other sub-groupings of information. These dynamically generated suggestions may be query-specific, result-specific, or page-specific. Moreover, the suggestions themselves may be generated when a user submits a query, clicks a link, or accesses a page.

In one embodiment, the suggestion engine generates the suggestions by extracting information from a referenced page. In another embodiment, the suggestions are provided by a page owner. In yet other embodiments, the suggestions are based on the recommendation of a panel of experts, based on a category, a site's popularity, whether a page links to the referenced page, and other criteria.

In some embodiments, the suggestions might be pre-fetched, cached, indexed, and stored until it is time to display them. For example, in FIG. 3, since adjacent items 340, 341 neighbor focus item 330, it is likely that one of them will become the next focus item. Accordingly, the suggestion engine might pre-fetch information from the web pages referenced by the adjacent items and generate suggestions related to those results. Then when a user switches the focus, the additional suggestions are more quickly included in the display.

Category-Organized Dynamic Suggestions

Presenting dynamic suggestions to a user both within the search environment, and after the user has navigated outside of the search environment, reduces the boundary between searching (typing queries into a search engine, getting a list of results) and browsing (clicking on hyperlinks in order to get to pages of interest).

Referring back to FIG. 3, the set of query-specific suggestions 310 are subdivided and organized into a number of separate categories. The subdivided categories, in dynamic suggestion window 310, include "Suggested topics" 311 (which links to other search result queries), "What people are saying about your topic" 312 (which provides links to message boards, forums, and blogs on the topic), "Resources and Reviews for topic products" 313 (which links to reviews of car audio products), and finally a "Related Directory Catecciories" 314 (which links to directories containing links to sites related to queried subject matter, namely "car audio installation."). Alternatively, other groupings and suggestions such as sponsored links or advertisements might be displayed. The number of groupings and types of suggestion implemented depends on user preference, operator design, electronic resources, etc.

Thus, techniques for providing dynamic suggestions allow users to navigate collections more effectively. The techniques reduce the number of times users have to go back to search sites and resubmit new queries.

The dynamic suggestion techniques may be implemented thusly, or in alternative ways.

III. Nonlinear Response Navigation

There are currently two primary ways to browse collections such as web search results, television listings, and message boards. One way is paging and the other is scrolling. Paging breaks the collections into small groups of data that fit within a single window and provides a control to navigate to the next set of results. Scrolling, on the other hand, keeps an entire collection together in one long display. To view the data, users use the scroll bar to show subsets of the collection that fit within the display window. Most previous techniques for displaying collections rely on a combination of both scrolling and paging. Typically, those previous techniques would show pages of 10 or so items per page, even though only 4 or 5 fit on the actual display screen and even though there may be hundreds of more items.

To overcome these limitations, nonlinear response navigation techniques ("navigator") provide ways of navigating through collections without necessarily using either scrolling or paging. In fact, these techniques reduce the need for both of them. In one embodiment, the navigator allows users to move at variable speeds through collections.

As with the other techniques described herein, implementations of the navigator vary. In one embodiment, navigator is implemented by an extension of a web browser. In another embodiment, the navigator is implemented by an extension, an application, or script executed by a web browser, database client program, file explorer, or other client-side application. Moreover, specific implementations may be written in any of a number of programming languages (e.g., C++, C#, Visual Basic, C, Java, XML, HTML, JavaScript, Flash, etc.).

The navigator provides a fin, intuitive feel while navigating data and provides a direct engagement interaction between user and data. The navigator enhances the normal browsing experience by visually enhancing the display based on the speed at which the user moves through the data. For instance, assume a user is navigating an online index. In one embodiment, when the user moves slowly through the list more index details are shown. When the user navigates quickly, few, if any, details are shown as the user passes list item. This adds to the impression that they are moving faster.

In one embodiment, the navigator can be used like a jog/shuttle controller, where user input manipulates the view to viscerally navigate and select items in an ordered collection.

User input is received from an input device such as a mouse, joystick, or game pad, or it may be represented as a "virtual joystick" on a computer screen. Alternatively, the user input may be implicitly embodied in the behavior of certain key presses (for example, the arrows on the computer keyboard), or it may be used to control one dimension of variation (as with a scroll wheel) or more. When supported, the navigator can actually be used to move through two or more dimensions of data simultaneously. For example, the navigator can simultaneously browse sets of items on the x-axis and items within those sets on the y-axis.

In one embodiment, the navigator distinguishes between navigation movements on an input device to determine how quickly to move through displayed data. Exemplary navigation movements include pushing a joystick or mouse in a particular direction, the length (duration) of holding down a key, the speed at which a key is repeatedly pressed, a key combination, etc.

For purposes of the illustration below, assume that an embodiment distinguishes between small navigation movements, intermediate navigation movements and large navigation movements. A small navigation causes a movement from a current item to the next item, an intermediate navigation causes a series of movements from the current item, and a large navigation causes display of motion representative of large movement through a search results set. Also, assume that a physical joystick is being used by a user to navigate.

Figure 5:
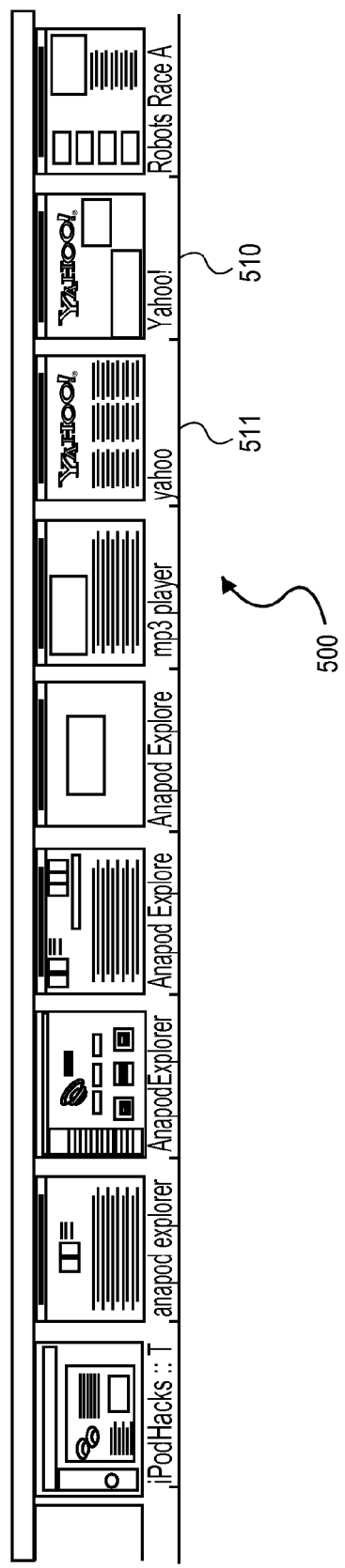
FIG. 5 illustrates an exemplary display depicting a navigable web browser history, in accordance with an embodiment of the invention.

FIG. 5 shows a thumbnail history of recently accessed websites. The thumbnails are presented horizontally along a display screen like a film reel, with each frame representing a previously accessed website. Note that the history may continue well past the edges of the display screen. In the past, a user would have to click back through various screens to find an earlier visited website. In accordance with one embodiment, the user can navigate the history in one long visual stream.

Turning to FIG. 5, reel 500 frames thumbnail pages from recently visited websites. Frame 510 is the current selection in the web history. In one embodiment, the user pushes the joystick slightly to the left, manipulating the joystick along the x-axis. This small leftward (i.e. negative x) motion on the joystick moves the current selection from frame 510 to focus and makes frame 511 (immediately to the left of frame 510) the current selection. In this example, a larger leftward motion causes the selection to continue moving left is a series of frames. Once the left edge of the display screen is reached, further leftward motion of the selection is implied by a rightward motion of the frames. Notably, the smaller motions provide one visual effect, e.g., slowly moving from one frame to the next. The larger motions provide a different visual effect, e.g., the movement from one frane to the next is quicker. When the user applies a still larger leftward motion to the joystick, the result is a "blurring" visual effect, which conveys the sense that the frames (or items) are moving too rapidly to see.

In another embodiment, the page history might be subdivided into multiple reels, each displayed vertically below the other. According to an embodiment, a user might push the joystick slightly to the left and up simultaneously. In this scenario, the current selection moves diagonally to a frame in the reel above and to the left of the previous selection. Again, larger motions cause larger screen movements.

In yet another embodiment, other visual effects may be used to convey the movements. For instance, while browsing a list of fantasy sports players organized alphabetically, an "A" might be shown as the user navigates through players with last names beginning with "A." As the list transitions to the Bs, a "B" might be shown. Alternatively, if the players were ranked and subdivided into groups according to their projected value, the group title (e.g., "All-Stars") may be displayed as the user navigates the list.

In further embodiment, morphing images may be used. In an online dating scenario, a user browses a list of potential dates. Based on completed questionnaires, participants are ranked in terms of their compatibility with the user. As the user navigates the list from top to bottom an image of a match (e.g., "the perfect match") might morph into a lit match and then to a burnt match as the user reaches the bottom of the list.

The navigator is particularly well-suited to applications where the selected item behaves in a different way from the others, or where selecting the item causes a noticeable response. In various embodiments, the navigator is combined with techniques for implementing the semantic fisheye and dynamic suggestions.

An example may be illustrated by referring back to FIG. 1. In FIG. 1, the navigator might facilitate the process of interactively navigating the displayed search results. For instance, assume that the search results list in FIG. 1 is long, and a user presses arrow keys to navigate the list. Distinct presses of the down arrow key move the focus from one item to the next. So, in FIG. 1, pressing the down arrow key once moves the focus from item 03 to item 04. In accordance with the semantic fisheye technique, the focus, item 04, displays additional details and item 03 reverts to a lesser amount of detail. Next, the user presses the down arrow key multiple times in a sequence. Using semantic fisheye and dynamic suggestion techniques, semantic detail should be added and removed as the focus changes. In one embodiment, the navigator controls how fast those details are displayed.

In one embodiment, the navigator prevents semantic detail from being immediately displayed until a user pauses or stops on an item. Accordingly, as the user presses the down arrow key fewer details are displayed, until the user stops. At that point, all the semantic detail relating to the focus and other items (with their associated levels of detail) are displayed.

If, in that same embodiment, the user holds the arrow key down, then the navigator shows even fewer details and may even show a blurring visual effect until the user releases the down arrow key. At which point the focus and associated semantic detail would be displayed according to the techniques described above.

In various embodiments, other interactive content such as sounds, music, images, and video content may all be used to indicate the varying speeds of navigation. For example, as a user moves from one item in a collection to the next, the navigator may output a clicking sound. Or, as the user navigates more rapidly through a collection a whirring sound or the sound of a film projector may be included.

The navigator techniques provide users with an interactive navigation experience. It may be implemented as described, or in alternative ways.

IV. Audio Feedback

When browsing collections of information such as a search results list, EPG, or email message list, in the past, there have been many ways to draw a user's attention to the current selection and give additional information about it. Web search engines have used rank numbers, scores, or "thermometer" icons to indicate relevance, and a variety of textual (e.g., "refreshed in last 24 hours," "New!") or visual (e.g., logos for various document types) indicators to convey other properties of the underlying web page. AltaVista used to have a light blue vertical bar on the left of the column of search results; when the user moved the mouse over a particular result, the part of the bar adjacent to that result would darken, effectively highlighting that item. Moving the mouse down the page thus caused the items to be highlighted one at a time.

These approaches all rely exclusively on visual cues to attract a user's attention, which neglect a whole other channel of sensory communication, namely audio. In the real world, audio often discloses different information than video. For example, in a car, the shifting pitch of an ambulance siren discloses whether the ambulance is approaching or leaving, even if it is out of view. Drivers with manual transmission often know when to shift into a new gear merely by the sound of the engine. Using both audio and visual indicators, a user can process different kinds of information simultaneously, since the indicators are coming from different senses. Ultimately, in various embodiments, audio may greatly enhance the immersive, interactive nature of a navigation experience.

Audio feedback techniques are provided to convey audio cues about navigable data. Audio cues stored (or associated) with a collection may indicate a variety of characteristics about items in the collection.

For example, when browsing a list of web pages, more popular pages might have louder sounds associate with them, longer pages might have lower pitched sounds associated with them, one type of document might produce a sound different from another type (e.g., rolling the mouse over a PDF document sounds different than rolling over an HTML document), etc. Basically, different types of audio cues may be played for different actions.

As with other described techniques, how the audio feedback technique is implemented varies. In one embodiment, the audio feedback generator is implemented by an extension to a browser. Alternatively, the audio feedback technique is implemented by a plug-in, an extension, an application, or script executed by a web browser, client program, file explorer, or other client-side program. Moreover, implementations are written in any of a number of programming languages (e.g., C++, C#, Visual Basic, C, Java, XML, HTML, JavaScript, Flash, etc.).

FIG. 1 illustrates a search results list, which is an exemplary environment for playing audio feedback. In this example, a user browses the list to find information. As the user moves from item to item in the list, in one embodiment, audio cues accompany the movement. For example, as a user moves from item 110 to the next item 121, an accompanying clicking sound might be played. As the user navigates more quickly through the data, a whirring sound might be played to enhance the navigation experience.

Alternatively (or in some case, in addition to), the audio cues might indicate a number of characteristics about each item in the list. For example, the audio cue may identify underlying page format (e.g., whether the linked page is HTML, PDF, etc.), page topic (e.g., whether the page is sports-related, food-related, car-related, etc.), properties of the site (e.g., whether it is a high traffic site), authority of site (how many people link to that site), or any of a number of other characteristics.

In an online dating service example, various audio cues may be used to indicate a "hot" or "not" rating for participants based on other users' reviews. A sizzling sound may be associated with highly-ranked individuals, and a barking sound with lower-ranked participants.

In an EPG environment, a sitcom entry might have a laugh track audio cue associated with it so when a user accesses that sitcom item, the laugh track plays, identifying the type of show. Legal dramas may have a gavel sound associated with them, televised sporting events might have a different sound associated with them, etc.

Notably, the audio cues may be differentiated by volume, pitch, speed, length of play, etc. In some embodiments, users can customize these audio cues, trade them with others, or download them. In other embodiments, conventional "auditory icons" might be used for the cues.

The audio feedback technique may be implemented thusly, or, in alternative ways.

Note that for purposes of illustration, the present description and drawings may make reference to specific search result products, pages, URLs, and/or web pages. Such use is not meant to imply any opinion, endorsement, or disparagement of any actual web page or site. Further, it is to be understood that the invention is not limited to particular examples illustrated herein.

Hardware Overview

Figure 6:
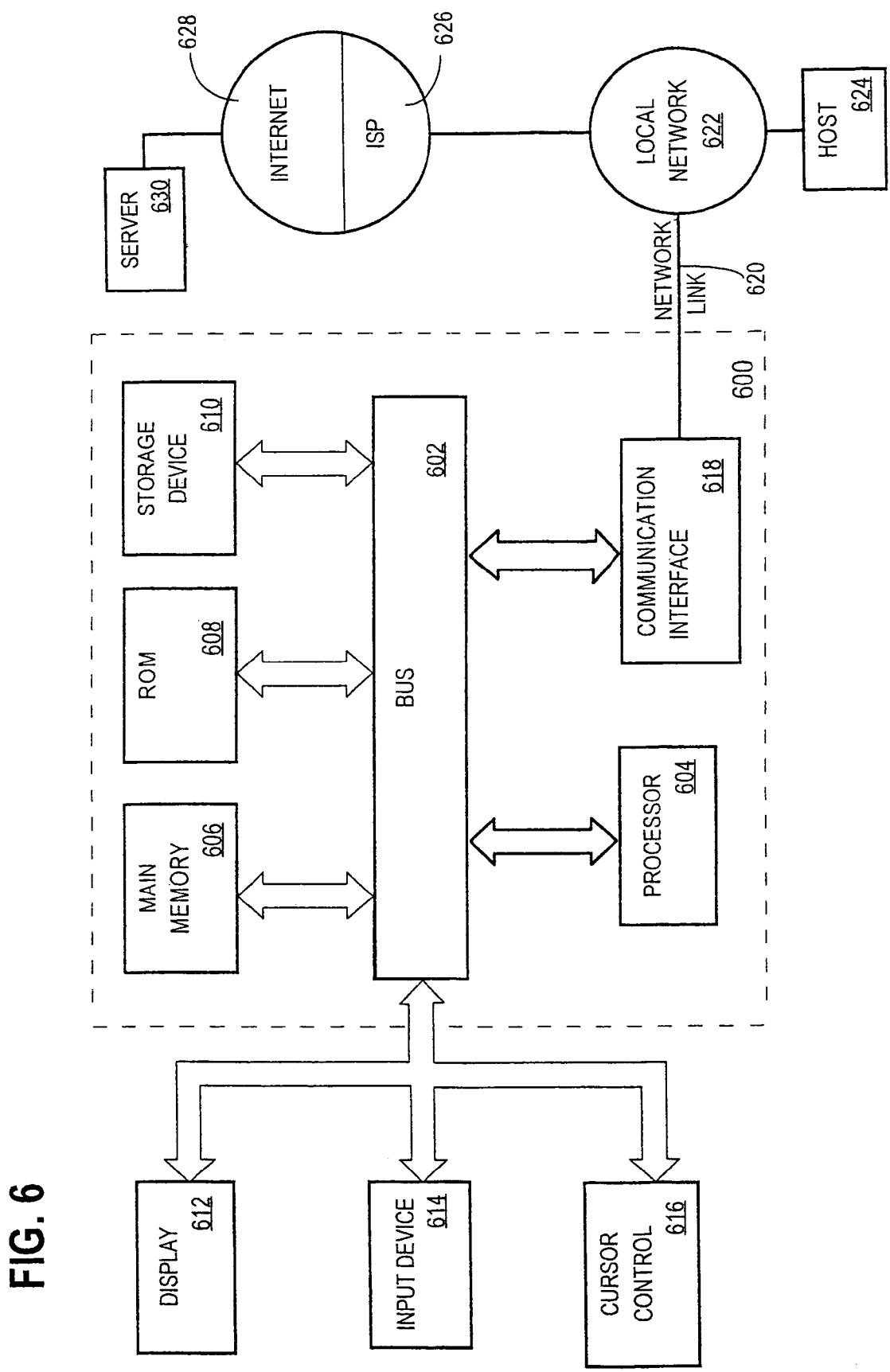
FIG. 6 is a block diagram that illustrates a computing device upon which an embodiment of the invention may be implemented.

FIG. 6 is a block diagram that illustrates a computing device 600 upon which an embodiment of the invention may be implemented. Computing device 600 includes a bus 602 or other communication mechanism for communicating information, and a processor 604 coupled with bus 602 for processing information. Computing device 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computing device 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computing device 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computing device 600 for implementing the techniques described herein. According to one implementation of the invention, those techniques are performed by computing device 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative implementations, hard-wired circuitry may be used in place of or in combination with software instructions to implement the invention. Thus, implementations of the invention are not limited to any specific combination of hardware circuitry and software.

The term "machine-readable medium" as used herein refers to any medium that participates in providing data that causes a machine to operation in a specific fashion. In an implementation implemented using computing device 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computing device 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computing device 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone or cable line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computing device 600, are exemplary forms of carrier waves transporting the information.

Computing device 600 can send messages and receive data, including program code, through the network(s), network link 620 and communication interface 618. In the Internet example, a server 630 might transmit a requested code for an application program through Interriet 628, ISP 626, local network 622 and communication interface 618.

The received code may be executed by processor 604 as it is received, and/or stored in storage device 610, or other non-volatile storage for later execution. In this manner, computing device 600 may obtain application code in the form of a carrier wave.

Of course, this is just one example of a computing device configuration. In another embodiment, the computing device configuration might be different. In one embodiment, the computing device is a computer system, a personal digital assistant, cell phone, etc.

In the foregoing specification, implementations of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising the steps of:

presenting to a user at least a portion of an ordered collection, wherein the portion comprises a set of entries that correspond to items in the ordered collection;

identifying a current location of a focus, wherein the current location of the focus corresponds to a subset of the set of entries;

selecting a level of detail, from a set of at least three distinct levels of detail, for each entry in the set of entries based on (a) the current location of the focus and (b) a current location of each entry, wherein the at least three distinct levels of detail include a first level of detail, a second level of detail that is more detailed than the first level of detail, and a third level of detail that is more detailed than the second level of detail;

displaying, for each entry, a set of semantic details that is based on the level of detail that was selected for each entry; and wherein each level of detail from the set of at least three distinct levels of detail is used to display at least one entry in said portion;

wherein any entry of the set of entries that coincides with the current location of the focus is displayed at a highest level of detail of the set of at least three distinct levels of detail; and receiving user input that shifts the focus in a particular direction, wherein the shifting of the focus (a) moves the focus away from at least a first entry of the set of entries and a second entry of the set of entries, and (b) moves the focus toward at least a third entry of the set of entries and a fourth entry of the set of entries;

wherein the second entry is between the first entry and the third entry;

wherein the third entry is between the second entry and the fourth entry;

in response to receiving the user input, automatically:
  collapsing the detail with which the first entry is displayed from the second level of detail to the first level of detail;
  collapsing the detail with which the second entry is displayed from the third level of detail to the second level of detail;
  expanding the detail with which the third entry is displayed from the second level of detail to the third level of detail;
  expanding the detail with which the fourth entry is displayed from the first level of detail to the second level of detail;
  wherein the method is performed by one or more computing devices programmed to be special purpose machines pursuant to program instructions.

2. The method of claim 1, wherein the level of detail is selected based on the current location of each entry's proximity to the current location of the focus.

3. The method of claim 1, wherein the set of semantic details comprises at least one of a summary of an item's content, a thumbnail image, an image from the item, a logo, a key concepts, and metadata.

4. The method of claim 2, wherein the at least three distinct levels of detail comprise a focus level of detail associated with the focus, an adjacent level of detail associated with entries adjacent to the focus, and a distant level of detail for the other entries.

5. The method of claim 4 wherein the set of semantic details associated with the focus is larger than the other sets of semantic details.

6. The method of claim 5, wherein the set of semantic details associated with the adjacent level of detail comprises fewer details than the set of semantic details associated with the focus and more details than the sets of semantic details associated with entries at the distant level of detail.

7. The method of claim 1, wherein the set of semantic details for an entry includes information that originates from a source other than an item that corresponds to the entry.

8. The method of claim 1, wherein displaying, for each entry, a set of semantic detail includes inserting the set of semantic detail in-line.

9. The method of claim 1, wherein displaying, for each entry, a set of semantic details comprises:
  retrieving, for each entry, the set of semantic details;
  resizing the associated set of semantic detail proximate to each entry; and
  adjusting the position of each entry in the set of entries to fit on a display.

10. The method of claim 1, wherein identifying the current location of the focus comprises:
  receiving user input from a navigation device; and
  navigating to an area on a display indicated by the user input from the navigation device.

11. The method of claim 10, wherein the navigating is accompanied by an audio cue.

12. The method of claim 9, wherein adjusting the position of each entry in the set of entries to fit the display includes modifying at least one of the group of shading, font size, font style, and font type of the entry.

13. The method of claim 1, wherein the ordered collection of information is a set of search results.

14. The method of claim 1, wherein the ordered collection of information is an electronic programming guide.

15. The method of claim 10, wherein the current location of the focus is controlled by a nonlinear response navigator.

16. The method of claim 1 wherein displaying, for each entry, the set of semantic details includes inserting the set of semantic details for each entry in-place proximate to associated entry.

17. The method of claim 1, wherein the set of semantic details includes dynamically generated suggestions.

18. The method of claim 1, wherein presenting to a user includes presenting to the user in a web browser.

19. A method comprising the steps of:
  presenting to a user, in a web browser, a search results list, wherein the search results list comprises a set of hyperlinks corresponding to web pages;
  selecting a focus from the set of hyperlinks, wherein the focus corresponds to a subset of the set of hyperlinks;
  selecting a level of detail, from a set of at least three distinct levels of detail, for each hyperlink in the set of hyperlinks based on (a) the current location of the focus and (b) a current location of each hyperlink in relation to the focus, wherein the at least three distinct levels of detail include a first level of detail, a second level of detail that is more detailed than the first level of detail, and a third level of detail that is more detailed than the second level of detail;
  displaying, for each hyperlink, a set of semantic details that is based on the level of detail that was selected for each hyperlink;
  wherein each level of detail is used to display at least one hyperlink in said search results list; and
  wherein the semantic detail of at least one hyperlink includes information that originates from a source other than the web page that corresponds to the hyperlink;
  receiving user input that shifts the focus in a particular direction, wherein the shifting of the focus (a) moves the focus away from at least a first hyperlink of the set of hyperlinks and a second hyperlink of the set of hyperlinks, and (b) moves the focus toward at least a third hyperlink of the set of hyperlinks and a fourth hyperlink of the set of hyperlinks;
  wherein the second hyperlink is between the first hyperlink and the third hyperlink;
  wherein the third hyperlink is between the second hyperlink and the fourth hyperlink;
  in response to receiving the user input, automatically:
    collapsing the detail with which the first hyperlink is displayed from the second level of detail to the first level of detail;
    collapsing the detail with which the second hyperlink is displayed from the third level of detail to the second level of detail;
    expanding the detail with which the third hyperlink is displayed from the second level of detail to the third level of detail;
    expanding the detail with which the fourth hyperlink is displayed from the first level of detail to the second level of detail;
  wherein the method is performed by one or more computing devices programmed to be special purpose machines pursuant to program instructions.

20. A computer-readable storage medium storing instructions, the instructions including instructions which, when executed by one or more processors, cause the one or more processors to perform the steps of:
  presenting to a user at least a portion of an ordered collection, wherein the portion comprises a set of entries that correspond to items in the ordered collection;

identifying a current location of a focus, wherein the current location of the focus corresponds to a subset of the set of entries;

selecting a level of detail, from a set of at least three distinct levels of detail, for each entry in the set of entries based on (a) the current location of the focus and (b) a current location of each entry, wherein the at least three distinct levels of detail include a first level of detail, a second level of detail that is more detailed than the first level of detail, and a third level of detail that is more detailed than the second level of detail;

displaying, for each entry, a set of semantic details that is based on the level of detail that was selected for each entry; and wherein each level of detail from the set of at least three distinct levels of detail is used to display at least one entry in said portion;

wherein any entry of the set of entries that coincides with the current location of the focus is displayed at a highest level of detail of the set of at least three distinct levels of detail; and receiving user input that shifts the focus in a particular direction, wherein the shifting of the focus (a) moves the focus away from at least a first entry of the set of entries and a second entry of the set of entries, and (b) moves the focus toward at least a third entry of the set of entries and a fourth entry of the set of entries;

wherein the second entry is between the first entry and the third entry;

wherein the third entry is between the second entry and the fourth entry;

in response to receiving the user input, automatically:
collapsing the detail with which the first entry is displayed from the second level of detail to the first level of detail;
collapsing the detail with which the second entry is displayed from the third level of detail to the second level of detail;
expanding the detail with which the third entry is displayed from the second level of detail to the third level of detail;
expanding the detail with which the fourth entry is displayed from the first level of detail to the second level of detail.

21. The computer-readable storage medium of claim 20, wherein the level of detail is selected based on the current location of each entry's proximity to the current location of the focus.

22. The computer-readable storage medium of claim 20, wherein the set of semantic details comprises at least one of a summary of an item's content, a thumbnail image, an image from the item, a logo, a key concepts, and metadata.

23. The computer-readable storage medium of claim 21, wherein the at least three distinct levels of detail comprise a focus level of detail associated with the focus, an adjacent level of detail associated with entries adjacent to the focus, and a distant level of detail for the other entries.

24. The computer-readable storage medium of claim 23 wherein the set of semantic details associated with the focus is larger than the other sets of semantic details.

25. The computer-readable storage medium of claim 24, wherein the set of semantic details associated with the adjacent level of detail comprises fewer details than the set of semantic details associated with the focus and more details than the sets of semantic details associated with entries at the distant level of detail.

26. The computer-readable storage medium of claim 20, wherein the set of semantic details for an entry includes information that originates from a source other than an item that corresponds to the entry.

27. The computer-readable storage medium of claim 20, wherein displaying, for each entry, a set of semantic detail includes inserting the set of semantic detail in-line.

28. The computer-readable storage medium of claim 20, wherein displaying, for each entry, a set of semantic details comprises:
retrieving, for each entry, the set of semantic details;
resizing the associated set of semantic detail proximate to each entry; and
adjusting the position of each entry in the set of entries to fit on a display.

29. The computer-readable storage medium of claim 20, wherein identifying the current location of the focus comprises:
receiving user input from a navigation device; and
navigating to an area on a display indicated by the user input from the navigation device.

30. The computer-readable storage medium of claim 29, wherein the navigating is accompanied by an audio cue.

31. The computer-readable storage medium of claim 28, wherein adjusting the position of each entry in the set of entries to fit the display includes modifying at least one of the group of shading, font size, font style, and font type of the entry.

32. The computer-readable storage medium of claim 20, wherein the ordered collection of information is a set of search results.

33. The computer-readable storage medium of claim 20, wherein the ordered collection of information is an electronic programming guide.

34. The computer-readable storage medium of claim 29, wherein the current location of the focus is controlled by a nonlinear response navigator.

35. The computer-readable storage medium of claim 20, wherein displaying, for each entry, the set of semantic details includes inserting the set of semantic details for each entry in-place proximate to associated entry.

36. The computer-readable storage medium of claim 20, wherein the set of semantic details includes dynamically generated suggestions.

37. The computer-readable storage medium of claim 20, wherein presenting to a user includes presenting to the user in a web browser.

38. A computer-readable storage medium storing instructions, the instructions including instructions which, when executed by one or more processors, cause the one or more processors to perform the steps of:
presenting to a user, in a web browser, a search results list, wherein the search results list comprises a set of hyperlinks corresponding to web pages;
selecting a focus from the set of hyperlinks, wherein the focus corresponds to a subset of the set of hyperlinks;
selecting a level of detail, from a set of at least three distinct levels of detail, for each hyperlink in the set of hyperlinks based on (a) the current location of the focus and (b) a current location of each hyperlink in relation to the focus, wherein the at least three distinct levels of detail include a first level of detail, a second level of detail that is more detailed than the first level of detail, and a third level of detail that is more detailed than the second level of detail;

displaying, for each hyperlink, a set of semantic details that is based on the level of detail that was selected for each hyperlink;
wherein each level of detail is used to display at least one hyperlink in said search results list; and
wherein the semantic detail of at least one hyperlink includes information that originates from a source other than the web page that corresponds to the hyperlink;
receiving user input that shifts the focus in a particular direction, wherein the shifting of the focus (a) moves the focus away from at least a first hyperlink of the set of hyperlinks and a second hyperlink of the set of hyperlinks, and (b) moves the focus toward at least a third hyperlink of the set of hyperlinks and a fourth hyperlink of the set of hyperlinks;
wherein the second hyperlink is between the first hyperlink and the third hyperlink;
wherein the third hyperlink is between the second hyperlink and the fourth hyperlink;
in response to receiving the user input, automatically:
collapsing the detail with which the first hyperlink is displayed from the second level of detail to the first level of detail;
collapsing the detail with which the second hyperlink is displayed from the third level of detail to the second level of detail;
expanding the detail with which the third hyperlink is displayed from the second level of detail to the third level of detail;
expanding the detail with which the fourth hyperlink is displayed from the first level of detail to the second level of detail.

* * * * *